Sept. 18, 1956
A. L. WELLS
2,763,191
INDEXING MECHANISM
Filed March 24, 1954
2 Sheets-Sheet 1
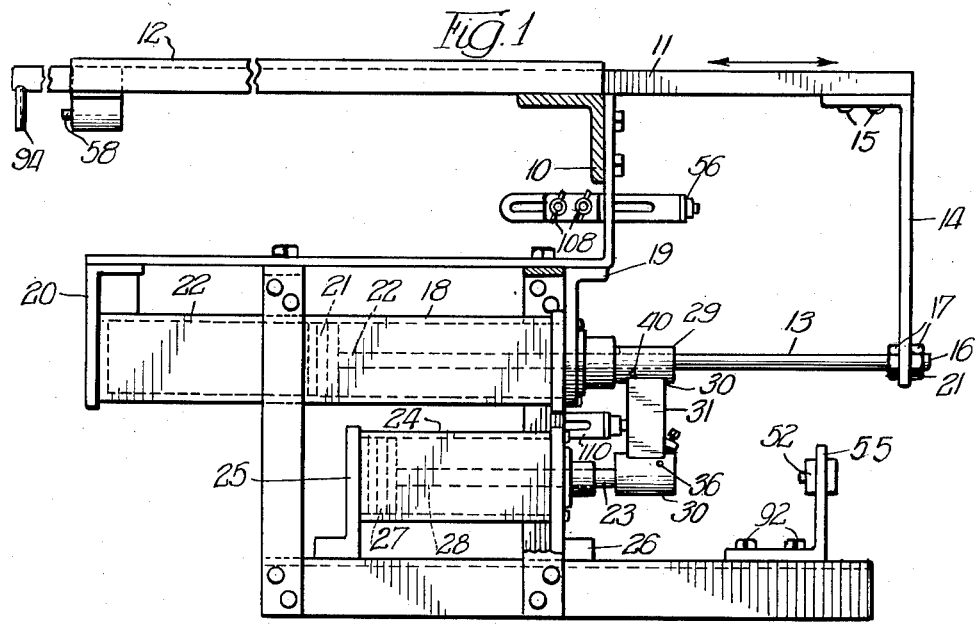
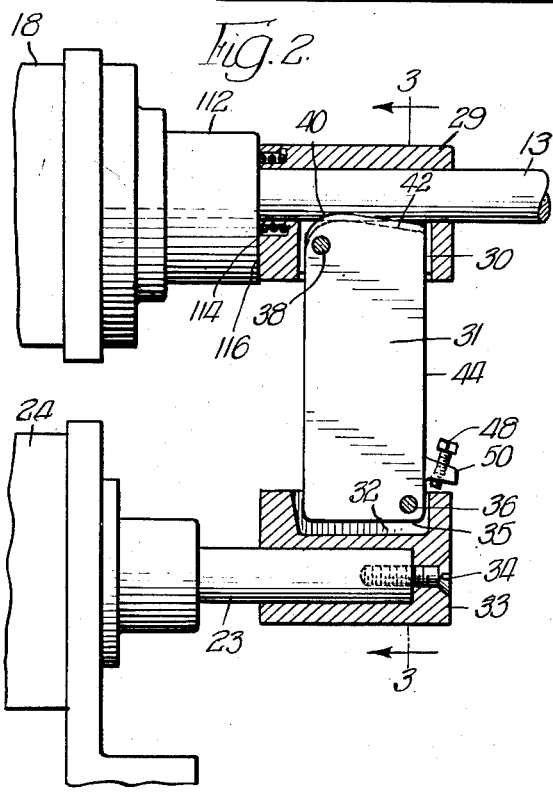
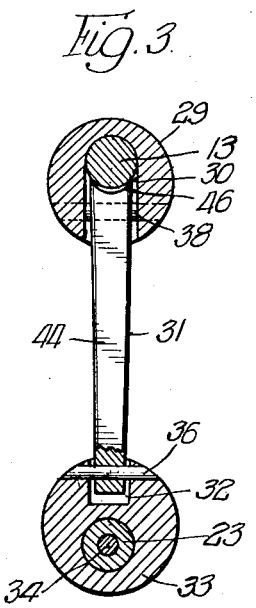
INVENTOR.
Arthur L. Wells,
BY Wilkinson, Huxley,
Byron & Hume
Attys.

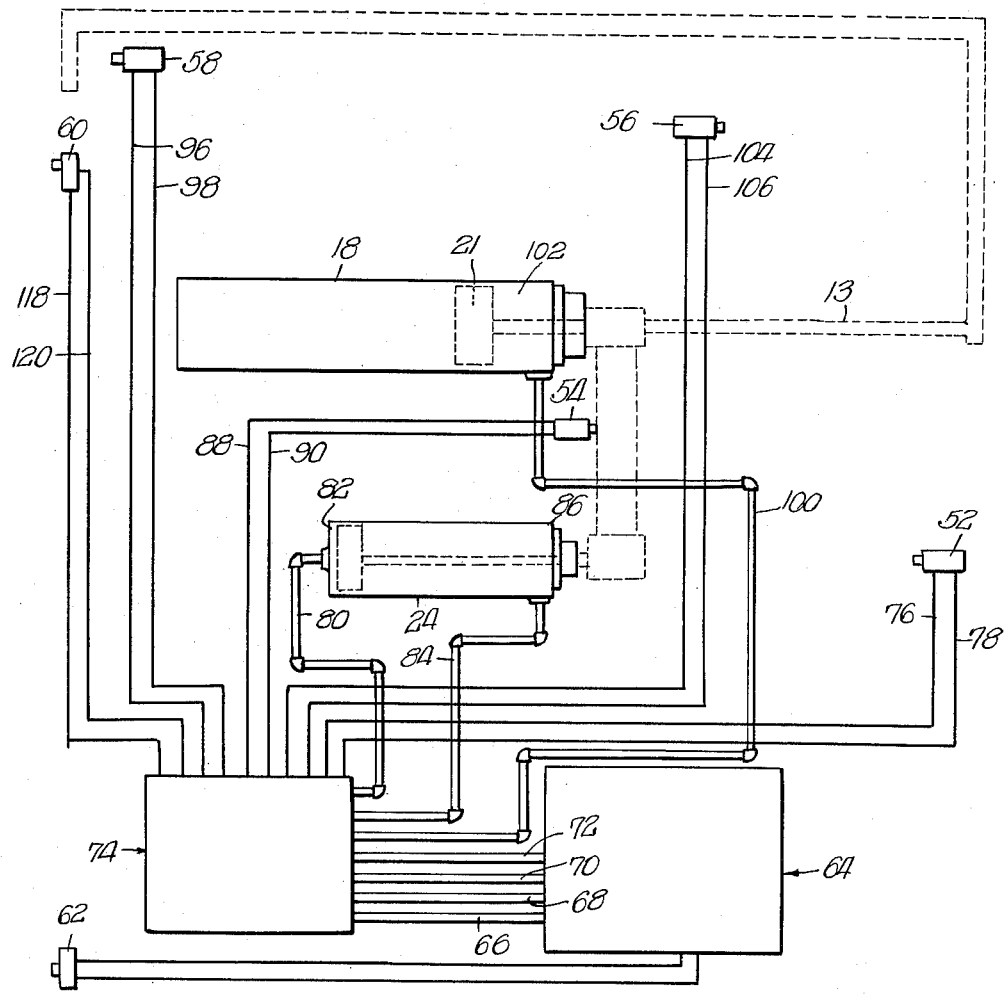

United States Patent Office 2,763,191
Patented Sept. 18, 1956

2,763,191
INDEXING MECHANISM
Arthur L. Wells, Des Plaines, Ill.
Application March 24, 1954, Serial No. 418,365
9 Claims. (Cl. 90—58)

This invention relates to indexing apparatus, and more particularly, to apparatus for automatically positioning a work table in a machine tool in a continuous succession of uniformly spaced stations.

Many desirable forms of machine tool operation may be automatically performed on a work piece carried on a work table thus actuated. Often a basic requirement for such mass production technique is that the successive movements of the work table be identical in length. Further, it is necessary that the work table be repositioned at the initial station after each series of steps in order that the process may be continuous. Another desirable feature of such a machine tool is that the work table be manually adjustable so that it may be positioned in any desirable manner initially.

It is therefore an object of this invention to provide reciprocating means whereby a work table of a machine tool may be automatically moved through a predetermined series of uniform steps.

Another object of this invention is to provide a device of the type indicated, in which the work table is automatically retracted to its initial position after its traverse of a series of predetermined stations, and a new series begun.

Another object is to provide means to accomplish the foregoing objectives, which will at the same time permit the position of the work table to be freely adjustable initially, by hand.

Another object is to provide a pneumatically or hydraulically operated mechanism for so moving the work table of a machine tool which is relatively simple in both construction and operation and which therefore is inexpensive to produce and maintain.

Further objects and advantages of this invention will become evident as the description proceeds and from an examination of the accompanying drawing, which illustrates one embodiment of the invention, and in which similar numerals refer to similar parts throughout the several views.

In the drawings:

Fig. 1 is a view in side elevation of one form of indexing device embodying the present invention shown in association with a fragmentary portion of the supporting frame of a machine tool;

Fig. 2 is an enlarged view in side elevation and partly in cross section of the linkage elements shown in Fig. 1;

Fig. 3 is an end view partly in vertical cross section of the linkage elements shown in Fig. 2, the view being along the line 3—3 of Fig. 2; and Fig. 4 is a view in side elevation of the form of indexing device seen in Fig. 1 showing in diagrammatic form a control unit and pump, with switches, adapted for use with the device.

Referring now to Fig. 1, one form of indexing apparatus embodying the invention is shown therein attached to the frame 10 of a machine tool. The indexing apparatus includes a work table 11 adapted to carry a work piece (not shown) and to slide longitudinally in the channel 12 secured to the frame 10. The frame 10 is adapted to also support cutting, milling, drilling, punching, or other tools to operate on the work piece carried by the work table.

The work table 11 is preferably rigidly connected to a shaft 13 disposed in spaced parallel relationship thereto by means of the depending L-shaped beam 14 secured to the work table by bolts 15 and to one end 16 of the shaft 13 by nuts 17. The shaft 13, in the preferred form of the invention, is slidably mounted as a piston rod in an air cylinder 18 which may be secured to the frame 10 by the brackets 19 and 20. A piston 21 is secured to the opposite end 22 of the shaft 13 within the cylinder 18 so that movement thereof will cause axial movement of shaft 13. A second shaft 23 is slidably mounted in spaced parallel relation to the shaft 13 as a piston rod in a second air cylinder 24 which may be secured to the said frame 10 by the brackets 25 and 26. A piston 27 is secured to the end 28 of the shaft 23 so that movement thereof will cause axial movement of shaft 23. A sleeve 29 is slidably mounted on the shaft 13, and as is best shown in Figs. 2 and 3, has a longitudinal slot 30 formed therein which is adapted to receive one end of the substantially rectangular link member 31. The other end of the link 31 is pivotally secured in the slot 32 formed in a sleeve 33 fixed to the end of shaft 23 by means of the screw 34.

In order that the link 31 may be securely mounted in the sleeves 29 and 33, the bores of said sleeves are formed eccentrically so that the slots 30 and 32 may be formed at the portion of greatest radius in said sleeves.

The corner 35 of the link 31 may be pivotally secured within the slot 32 in the sleeve 33 by the pin 36. The diagonally opposite corner 40 of the link 31, which preferably is rounded, may be pivotally secured within the slot 30 in the sleeve 29 by the pin 38. The sleeve 29 is slidably mounted on the shaft 13. The end 42 of the link 31 thus disposed in the sleeve 29 forms a slightly obtuse angle with the edge 44 of the link 31 for a purpose which will later appear. A groove 46, best shown in Figure 3, may be reamed in the end 42 of the link 31, the arcuate cross-section thereof being complementary to the cross-section of the shaft 13. The link member 31 may thus securely grip the shaft 13 when the link is pivoted in a counterclockwise direction about the pin 38, as viewed in Figure 2.

Since forward motion of the shaft 23 (to the right as viewed in Figure 2), will so pivot the link 31, the shaft 13 will normally be moved forward along with the shaft 23, if the moving force is applied initially through the shaft 23.

An adjustable stop screw 48 may be provided in a projecting arm 50 formed on the link 31 immediately above the pin 36. The lower end of the stop screw 48 is adapted to abut the sleeve 33 and may be adjusted so as to vary the amount of movement that can be given to the link 31. When the shaft 23 is moved to the right, as shown in Figure 2, the link 31 will pivot in a counterclockwise direction until the upper end 42 of the link is brought into abutment with the shaft 13. The rest position of this end 42 will be determined by the adjustment of the stop screw 48 and thus excess lost motion at the beginning of the traverse of the shaft 23 may be avoided.

As previously stated, the shaft 13 may be moved to the right, as viewed in Figure 2, by like movement of the shaft 23, the shaft 13 being carried along with the former through the operation of the link 31 just described. Movement of the shaft 23 is accomplished by appropriate activation of the piston 27, to be subsequently described.

A switch member 52, which may be either of an electrical, pneumatic, or hydraulic character, may be mounted on a support 55 secured to a portion of the frame 10 of the machine tool, to act as a stop limit for the travel of the shaft 23. Although the activation of the indexing mechanism can be either pneumatic or hydraulic, the preferred form will be shown as pneumatically operated and the controlling mechanisms will be illustrated as being electrically operated, although as just stated with respect to switch member 52, the controlling mechanisms could also be either pneumatic or hydraulic in character.

As best shown in Figure 4, in addition to the pneumatic system which actually operates the indexing mechanism, an electrical control system can be utilized incorporating the switch members 52, 54, 56, 58, 60, and 62. A pneumatic pump, illustrated diagrammatically in Figure 4 and indicated generally by the numeral 64, may be provided as a source of air pressure. This pump may have a separate control such as the electrical switch member 62, so that at any time when it is so desired the pneumatic pressure may be immediately shut off.

A number of pneumatic conduits 66, 68, 70, and 72 are shown extending from the pump 64 to the control unit shown diagrammatically and indicated generally by the numeral 74. This control unit 74 contains a number of electrically operated valve members (not shown) which control the application of pneumatic pressure in response to the activation of the various electrical switch members.

Switch member 52, for example, is provided with the electrical circuit made up of the lines 76 and 78 and is adapted to be activated by being contracted by the sleeve 33 on the shaft 23. This will occur when the shaft 23 has extended a distance sufficient to cause the sleeve to come into abutment with the switch member 52. Such movement of the shaft 23 results from the application of pneumatic pressure through the tube 80 to the end 82 of the cylinder 24, and movement of the piston 27 to the right as viewed in Figure 1. The initial application of pneumatic pressure in this manner through the tube 80 will be caused by depressing the switch member 60 which is located at a point convenient to the operator of the machine.

As soon as the sleeve 33 activates the switch 52 suitable valving members in the control unit 74 will be activated to cut off the pneumatic pressure from the tube 80 and apply it instead to the tube 84 connected to the opposite end 86 of the cylinder 24. This reversal of the application of the pneumatic pressure will cause the piston 27 to move to the left, as shown in Figure 1. As the shaft 23 is moved in this direction it will carry with it the link 31 and the sleeve 29, although the link 31 will release the shaft 13 under these conditions so that the shaft 23 will be returned to the initial position shown in Figure 1 along with the sleeves 29 and 33 and the link 31, but the shaft 13 will remain in the position which it had achieved prior to the reversal of the direction of movement of the shaft 23. When the link 31 has been returned to the position substantially as shown in Figure 1, it will come into contact with the switch member 54, which is connected by an electrical circuit made up of the lines 88 and 90 to the control unit 74. Activation of the switch member 54 will again reverse the valving members within the control unit so that pneumatic pressure is once again applied to the tube 80 and cut off from the tube 84. This will result in the movement of the piston 27 again to the right, as shown in Figure 1, along with the shaft 23 and the members associated therewith.

This arrangement results in the repeated advancement of the shaft 13 in a series of steps the length of which is determined by the disposition of the switch member 52, which may be adjustably positioned on the frame member 10 by the bolts 92. Such movement of the shaft 13 carries with it the work table 11 in a series of steps. Obviously, any machine tools which are positioned to act on the work piece carried by the work table can also be activated and deactivated by the switch members 52 and 54 so that their operation is automatic.

The switch member 58 is disposed so as to be abutted by the stop member 94 when the work table 11 has been moved the full length of its travel to the right, as shown in Figure 1. The switch member 58 has an electrical circuit formed of the lines 96 and 98 connecting it to the control unit 74. Activation of the switch member 58 may cause pneumatic pressure to be applied to the tube 100 to the end 102 of the cylinder 18 so as to cause the piston 21 to move to the left, as shown in Figure 1, and to thus move the shaft 13 and the work table 11 to the left, as shown in that figure. Because piston 21 is employed to move shaft 13 only to the left, no pressure is applied to the end of the cylinder 18 opposite 102, and such end may be vented to the atmosphere. Switch member 56 is connected to the electrical circuit formed of the lines 104 and 106 to the control unit 74, and it is adapted when activated to cut off the pneumatic pressure to the tube 100. These two switch members 56 and 58 therefore form stop limit switches for the travel of the work table 11 in either direction and provide a means of automatically returning the work table 11 to its initial position relative to the frame 10 of the machine tool mechanism.

As shown in Figure 1, switch member 56 may be mounted on the frame 10 so that its position can be adjusted through appropriate manipulation of the holding members 108. A similar mounting 110 may be provided for the switch member 54 to permit the making of any adjustments which may be found necessary in the position of that member.

When the shaft 13 is moved to the left, as shown in Figure 1, by application of pneumatic pressure through the tube 100, the sleeve 29, the link 31, the sleeve 33, and the shaft 23 are moved also as a unit, to the left since the application of force to the shaft 13 in that direction will cause the link member 31 to pivot in a counterclockwise direction, substantially in the manner as previously described. Switch 58 may condition lines 80, 84 of cylinder 24 for movement of piston 27 to the left with shaft 13. When the sleeve 29 comes into abutment with the head 112 of the cylinder 18, however, the shaft 13 will automatically be released from the grip of the upper end 42 of the link 31, which action is insured by the resilient member 114 disposed between the head 112 of the cylinder 18 and the end 116 of the sleeve 29. Resilient member 114 forces sleeve 29 to the right, as shown in Figure 2, thus, pivoting end 42 of link 31 out of locking engagement with shaft 13. It may thus be seen that the work table 11 may be freely moved in either direction, manually, when the indexing mechanism is not activated and the step by step movement of the work table 11, due to the automatic mechanism may be started with the work table 11 in any position of adjustment.

The cycle of operation may be resumed automatically upon return of the work table 11 and the activation of the switch member 56. However it may be more preferable to have each cycle begun by manually pressing the switch member 60, which is connected by the electrical circuit made up of the lines 118 and 120 to the control unit 74. In any event, in actual use the initial position of the work table 11 will be adjusted manually and then upon activation of the switch member 60 the work table will be moved forwardly in a succession of steps by the reciprocating action of the shaft 13. The material secured to the work table 11 will be brought past the operating tool or tools and an identical operation may be performed thereby at each station in the forward motion of the table. After the completion of a series of operations on a particular work piece thus positioned on the work table the work table will be retracted automatically whereupon the work piece can be readjusted either automatically or manually and the cycle of operation may be commenced again, either automatically or manually.

As previously indicated, the synchronization between the action of the tools and the movement of the work piece may be carried out by the appropriate use of the switch members 52 and 54. Likewise, if the position of the work piece on the work table 11 is to be changed automatically this operation may be controlled by the switch member 58.

The indexing mechanism, as just described, obviously provides a means of automatic indexed movement being applied to a work piece situated on a work table. It is believed that a relatively simple device has been provided which will accomplish a relatively complex movement of the work table automatically with a minimum of supervision.

In the drawings and specification there has been set forth a preferred embodiment of the invention and although specific terms are employed they are used in a generic and descriptive sense only and not for purposes of limitation. Changes in form and in the proportion of parts as well as the substitution of equivalents are contemplated as circumstances may suggest or render expedient without departing from the spirit or scope of this invention as further defined in the following claims.

It is claimed:

1. An indexing apparatus for a machine tool having a supporting frame and a work table comprising a shaft movably mounted on said frame, means adapted to reciprocate said shaft longitudinally, a linkage member pivotally secured to said shaft, and a second shaft movably mounted on said frame, said linkage member being adapted to lock said second shaft to said first named shaft during motion of the latter in one direction, so that motion is imparted to said second shaft, said linkage member also being adapted to release said second shaft during motion of said first shaft in the opposite direction, said second shaft being adapted to activate the work table of said machine tool.

2. In a machine tool, indexing apparatus comprising a frame, a shaft slidably mounted on said frame, means adapted to reciprocate said shaft, a linkage member pivotally mounted at one end of said shaft, said linkage being adapted to pivot in axial alignment with said shaft, a second shaft slidably mounted on said frame and spaced in parallel relationship to said first shaft, a sleeve slidably mounted on said second shaft, the other end of said linkage member being pivotally secured to said sleeve, said linkage member being adapted to snugly grip said second shaft when said first shaft is moved in one direction longitudinally, said linkage being adapted to release said second shaft when said first shaft is moved in the other direction longitudinally, and a work table movably secured to said frame, said table being rigidly secured to said second shaft in spaced parallel relationship thereto.

3. In a machine tool, apparatus comprising a frame, a cylinder mounted on said frame, a shaft slidably mounted in said cylinder, a piston in said cylinder adapted to actuate said shaft longitudinally, control means adapted to reverse the direction of movement of said shaft when activated by said shaft, a second air cylinder mounted on said frame, a second shaft slidably mounted in said second cylinder in spaced parallel relation to said first shaft, a piston in said second cylinder adapted to actuate said second shaft longitudinally, a work table connected to said second shaft, control means adapted to be activated by said work table, a link member pivotally mounted on said first shaft, and a sleeve slidably mounted on said second shaft, said sleeve being slotted to pivotally receive the other end of said link member, the end of said link pivoted to said slidable sleeve being disposed so as to engage said second shaft when said link is pivoted outwardly with respect to said cylinders by outward motion of said first shaft, said link being adapted to release said second shaft during return of said first shaft in said reciprocating cylinder.

4. In the device according to claim 3, a groove in the end of said link secured to said sleeve on said second shaft, said groove being complementary to the peripheral surface of said shaft whereby said beveled end of said link is adapted to grip securely said second shaft.

5. An indexing apparatus for a machine tool having a supporting frame comprising a reciprocating element, a link member pivotally secured to one end of said reciprocating element, a shaft secured to the work table of said machine tool in spaced relationship thereto, a connecting member movable along said shaft, said link being pivotally secured to said movable connecting member, said link member being adapted to engage said shaft during motion of said reciprocating element in one direction, said link member being adapted to release said shaft during motion of said reciprocating element in the other direction, and means adapted to return said second shaft to its initial position.

6. An indexing apparatus for a machine tool having a supporting frame comprising a shaft movably secured to said frame, piston means adapted to reciprocate said shaft in spaced parallel relation to the longitudinal axis of the work table of said machine tool, a link member pivotally secured to said shaft, a second shaft rigidly secured to said work table and movably mounted on said frame in spaced parallel relationship to said first shaft, a slide on said second shaft, a pivot securing said link member to said slide, said pivot being disposed in said link member at a point such that motion in one direction of said first shaft will cause said link member to grip said second shaft and such that motion in the opposite direction of said first shaft will cause said link member to release said second shaft, and piston means adapted to return said second shaft upon full extension thereof.

7. The device according to claim 6 wherein a stop member is secured to said first shaft adapted to maintain said link member at a minimal inclination from the vertical during motion of said first shaft in the direction effecting release of said second shaft.

8. In the device according to claim 6, a spring element secured to said slide and an abutment secured to said frame substantially abutting said slide at the return position of said slide, said abutment being adapted to maintain said link member in releasing position, said spring being adapted to effect release of said second shaft by said link member at said point of return in the event of fortuitous gripping at said point of return.

9. In an indexing mechanism in a machine tool, a longitudinally reciprocating shaft, a link pivotally secured to the free end of said shaft, a second shaft mounted for longitudinal movement in spaced parallel relation to said first shaft, a collar slidably secured to said second shaft and a pivotal connection between said collar and said link member adapted to cause said link member to grip said second shaft during travel in one direction of said first shaft and to release said shaft during travel of said first shaft in the other direction.

References Cited in the file of this patent

UNITED STATES PATENTS

| | | |
|---|---|---|
| 1,995,638 | Ferris et al. | Mar. 26, 1935 |
| 2,249,898 | Harley et al. | July 22, 1941 |
| 2,305,238 | Coats | Dec. 15, 1942 |
| 2,534,857 | Crewe | Dec. 19, 1950 |